(12) United States Patent
Mandel, III

(10) Patent No.: US 7,058,620 B1
(45) Date of Patent: Jun. 6, 2006

(54) CROSS-PLATFORM SUBSELECT METADATA EXTRACTION

(75) Inventor: Richard Henry Mandel, III, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/545,592

(22) Filed: Apr. 7, 2000

(51) Int. Cl.
*G06F 7/00* (2006.01)

(52) U.S. Cl. ............... 707/2; 707/1; 707/3; 707/4; 707/5

(58) Field of Classification Search ............ 707/1, 707/2, 3, 4, 5
See application file for complete search history.

(56) References Cited

U.S. PATENT DOCUMENTS

| | | | |
|---|---|---|---|
| 5,339,419 A | * | 8/1994 | Chan et al. |
| 5,379,419 A | | 1/1995 | Heffernan et al. ............ 707/4 |
| 5,787,412 A | | 7/1998 | Bosch et al. ............ 707/2 |
| 5,870,719 A | * | 2/1999 | Maritzen et al. ............ 705/26 |
| 5,991,754 A | | 11/1999 | Raitto et al. ............ 707/2 |
| 6,125,359 A | * | 9/2000 | Lautzenheiser et al. |
| 6,199,063 B1 | * | 3/2001 | Colby et al. ............ 707/4 |
| 6,275,852 B1 | * | 8/2001 | Filepp et al. ............ 709/220 |
| 6,430,556 B1 | * | 8/2002 | Goldberg et al. ............ 707/4 |

OTHER PUBLICATIONS

Elmasri et al., Fundamentals of Database Systems, Buschlen/Mowatt Fine Arts Ltd., Third Edition, pp. 30-31, 251-252.*
Elmasri et al., Fundamentals of Database Systems, copyright 1994, pp. 146 and 192-203.*
DB2 Server for OS/390 Version 5, <http://www.redbooks.ibm.com/abstracts/sg245421.html>.*

* cited by examiner

*Primary Examiner*—Jeffrey A. Gaffin
*Assistant Examiner*—Hung Pham
(74) *Attorney, Agent, or Firm*—Sughrue Mion, PLLC

(57) ABSTRACT

A metadata extraction system executes a query against a database on a data storage device connected to a computer. Initially, the query is modified to replace one or more selected clauses with a false clause. The modified query with the false clause is executed. Metadata is retrieved from the result set obtained by executing the modified query. The metadata is used to obtain column types, which are converted to Java™ types. Then, a SQLJ iterator is generated, which has parameters for the Java™ types.

33 Claims, 6 Drawing Sheets

US 7,058,620 B1

CROSS-PLATFORM SUBSELECT METADATA EXTRACTION

BACKGROUND OF THE INVENTION

1. Field of the Invention

This invention relates in general to computer-implemented database systems, and, in particular, to a technique for cross-platform subselect metadata extraction.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

In a DBMS, data records are stored in table spaces. A table space may contain one or more tables. Each table space contains a number of space map pages. Each space map page covers a number of data pages. One or more records can be stored in a single data page. All data pages within a single table space must have the same page size. Typically, a page contains 4096 bytes.

Some current systems provide a technique for obtaining column names and data types of a table or a query result. For example, the DB2® Universal Database (UDB) system from International Business Machines, Corporation has a DESCRIBE command for use in defining a result set (i.e., a query result). In particular, the DESCRIBE command lists column names and data types of a query result (i.e., a result set). The DB2® UDB system supports the DESCRIBE command for various platforms or operating systems, including UNIX®, Windows NT®, and OS/2® platforms and enables a developer to access table, view, or query metadata information. Metadata information comprises information about other information. For example, metadata provides type information about columns in a table.

SQLJ is a set of standards used to define how the Java™ programming language can be used with the Structured Query Language (SQL). SQLJ enables developers to use Java™ data types or classes as data types in SQL. Therefore, relational tables accessed within an SQLJ application may contain columns having Java™ data types or classes. A SQLJ stored procedure is considered a specialized type of SQLJ application. Additionally, a SQLJ iterator describes columns for a result set using Java™ types.

On the other hand, some systems do not provide such techniques for obtaining the types of a result set. The DB2® Version 5 of the OS/390® platform, on the other hand, does not have a DESCRIBE command. However, a developer can alter the Data Manipulation Language (DML) statement so that it returns no data, but allows full access to the metadata similar to that provided in the above DESCRIBE command.

The types of a result set is useful and desirable information. There is a need in the art of an improved technique of obtaining this information, across platforms.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented technique for cross-platform subselect metadata extraction.

In accordance with the present invention, a metadata extraction system executes a query against a database on a data storage device connected to a computer. Initially, the query is modified to replace one or more selected clauses with a false clause. The modified query with the false clause is executed. Metadata is retrieved from the result set obtained by executing the modified query. The metadata is used to obtain column types, which are converted to Java™ types. Then, a SQLJ iterator is generated, which has parameters for the Java™ types.

BRIEF DESCRIPTION OF THE DRAWINGS

Referring now to the drawings in which like reference numbers represent corresponding parts throughout.

DETAILED DESCRIPTION

In the following description of one embodiment of the invention, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
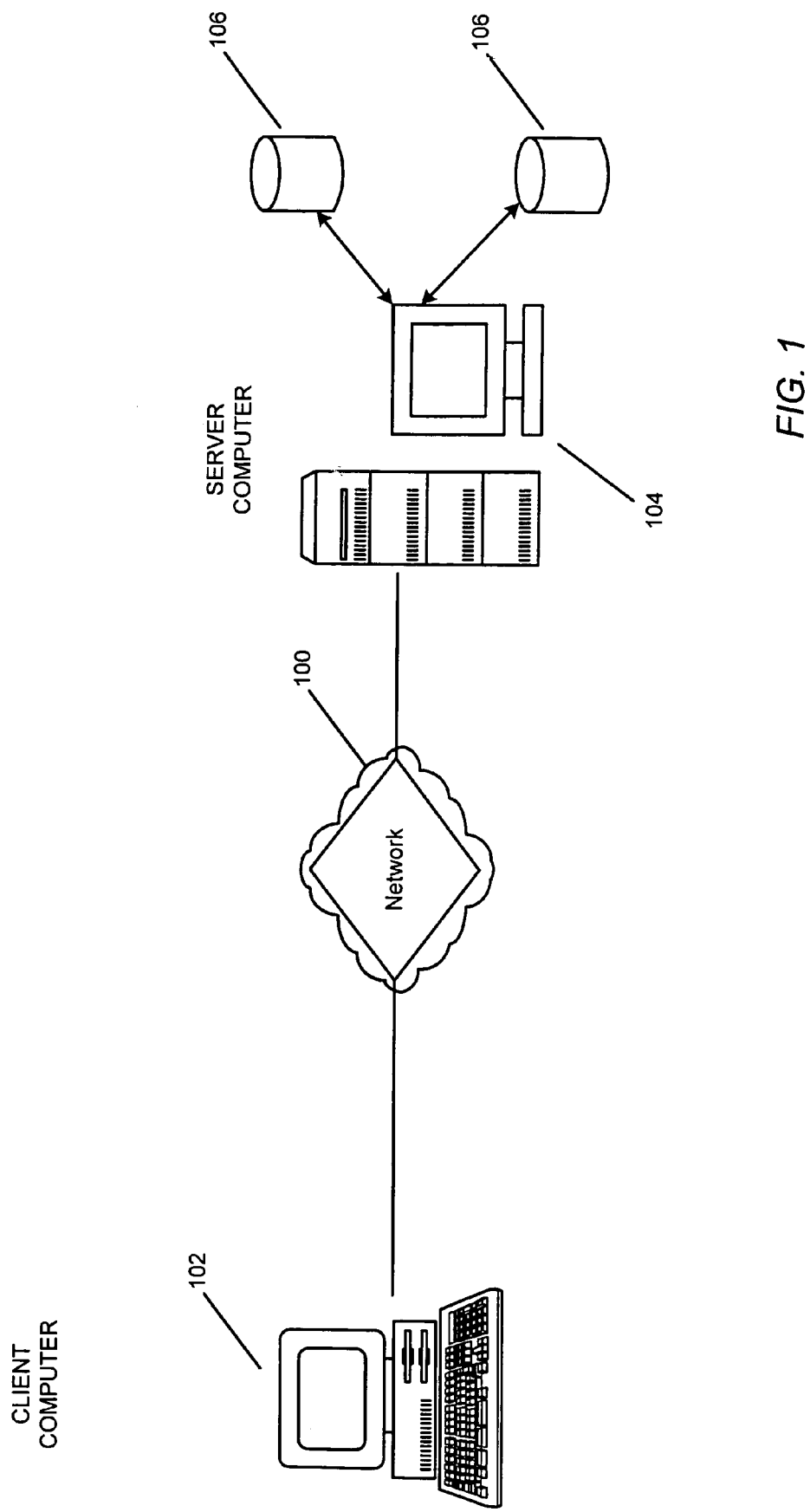
FIG. 1 schematically illustrates a hardware environment of an embodiment of the present invention.

FIG. 1 schematically illustrates a hardware environment of an embodiment of the present invention, and more particularly, illustrates a typical distributed computer system using the network 100 to connect client computers 102 executing client applications to a server computer 104 executing software and other computer programs, and to connect the server system 104 to data sources 106.

A typical combination of resources may include client computers 102 that are personal computers or workstations, and a server computer 104 that is a personal computer, workstation, minicomputer, or mainframe. These systems are coupled to one another by various networks, including LANs, WANs, and the Internet. The data sources 106 may be geographically distributed.

A client computer 102 typically executes a client application and is coupled to a server computer 104 executing server software. The client application program is typically a software program which can include, inter alia, multimedia based applications, e-mail applications, e-business applications, or workflow applications. The server computer 104 also uses a data source interface and, possibly, other computer programs, for connecting to the data sources 106. The client computer 102 is bi-directionally coupled with the server computer 104 over a line or via a wireless system. In turn, the server computer 104 is bi-directionally coupled with data sources 106. The computer 110 is bidirectionally coupled with the client computers 102 and the server computers 104.

The computer programs executing at each of the computers, including the Secure Access System 110, are comprised of instructions which, when read and executed by the computers, cause the computers to perform the steps necessary to implement and/or use the present invention. Generally, computer programs are tangibly embodied in and/or readable from a device, carrier, or media, such as memory, data storage devices, and/or data communications devices Under control of an operating system, the computer programs may be loaded from the memory, data storage devices, and/or data communications devices into the memory of each computer for use during actual operations.

Thus, the present invention may be implemented as a method, apparatus, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media, including the internet. Of course, those skilled in the art will recognize many modifications may be made to this configuration without departing from the scope of the present invention.

Those skilled in the art will recognize that the environment illustrated in FIG. 1 is not intended to limit the present invention. Indeed, those skilled in the art will recognize that other alternative hardware environments may be used without departing from the scope of the present invention. For example, the system described can apply either to a general-purpose computer, or to a special-purpose system.

Figure 2:
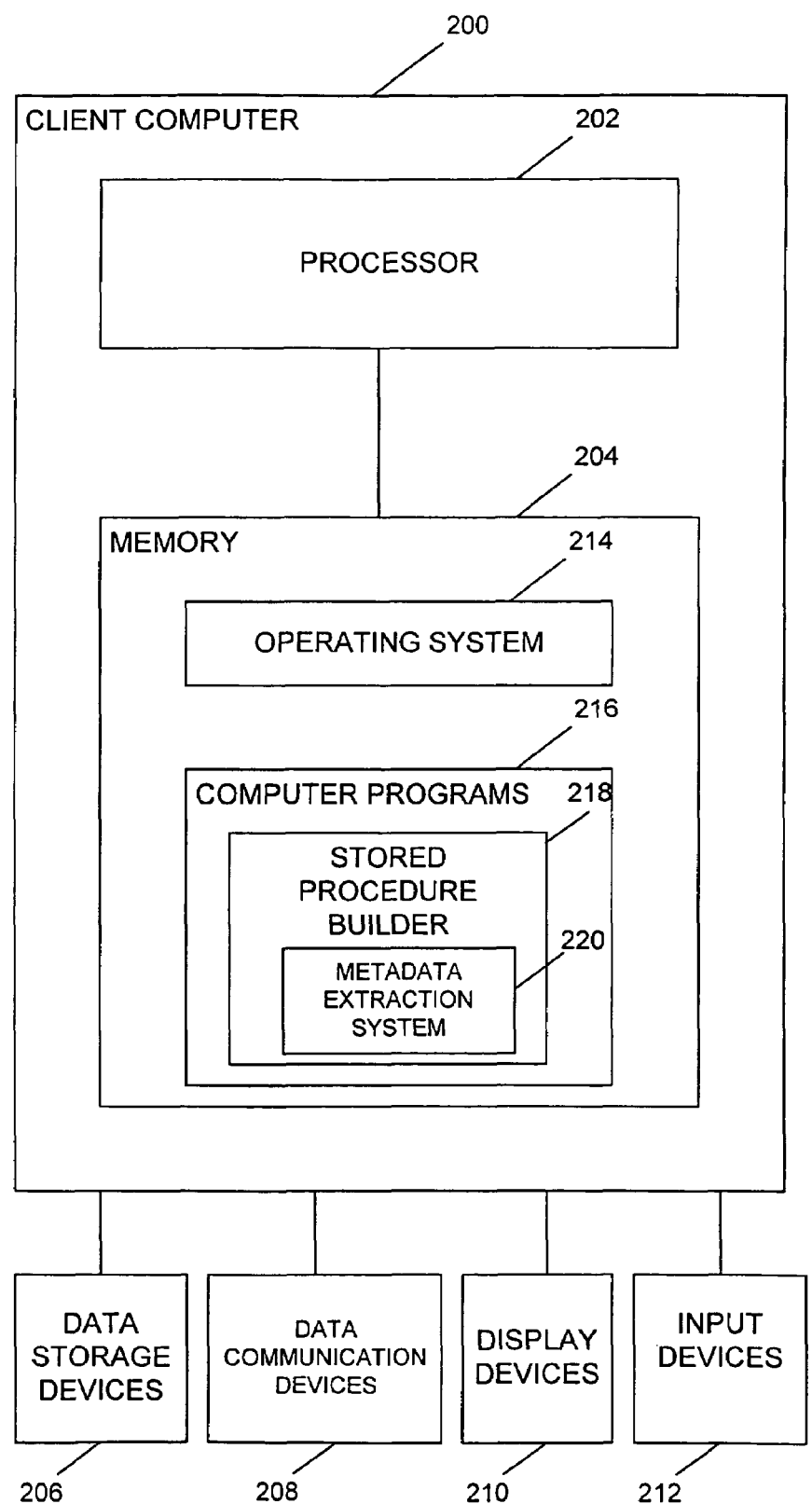
FIG. 2 is a hardware environment used to implement a client computer in one embodiment of the invention.

FIG. 2 is a hardware environment used to implement a client computer in one embodiment of the invention. The present invention is typically implemented using a client computer 200, which generally includes a processor 202, random access memory (RAM) 204, data storage devices 206 (e.g., hard, floppy, and/or CD-ROM disk drives, etc.), data communications devices 208 (e.g., modems, network interfaces, etc.), display devices 210 (e.g., CRT, LCD display, etc.), and input devices 212 (e.g., mouse pointing device, keyboard, and CD-ROM drive). It is envisioned that attached to the client computer 200 may be other devices, such as read only memory (ROM), a video card, bus interface, printers, etc. Those skilled in the art will recognize that any combination of the above components, or any number of different components, peripherals, and other devices, may be used with the client computer 200.

The client computer 200 operates under the control of an operating system (OS) 214.

The operating system 214 is booted into the memory 204 of the client computer 200 for execution when the client computer 200 is powered-on or reset. In turn, the operating system 214 then controls the execution of one or more computer programs 216, such as a Stored Procedure Builder 218, by the client computer 200. The Stored Procedure Builder 218 comprises a Metadata Extraction System 220. The present invention is generally implemented in these computer programs 216, which execute under the control of the operating system 214 and cause the client computer 200 to perform the desired functions as described herein.

The operating system 214 and computer programs 216 are comprised of instructions which, when read and executed by the client computer 200, causes the client computer 200 to perform the steps necessary to implement and/or use the present invention. Generally, the operating system 214 and/or computer programs 216 are tangibly embodied in and/or readable from a device, carrier, or media, such as memory 204, data storage devices 206, and/or data communications devices 208. Under control of the operating system 214, the computer programs 216 may be loaded from the memory 204, data storage devices 206, and/or data communications devices 208 into the memory 204 of the client computer 200 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 2 is not intended to limit the present invention. Indeed, those skilled in the art will recognize that other alternative hardware environments may be used without departing from the scope of the present invention.

Figure 3:
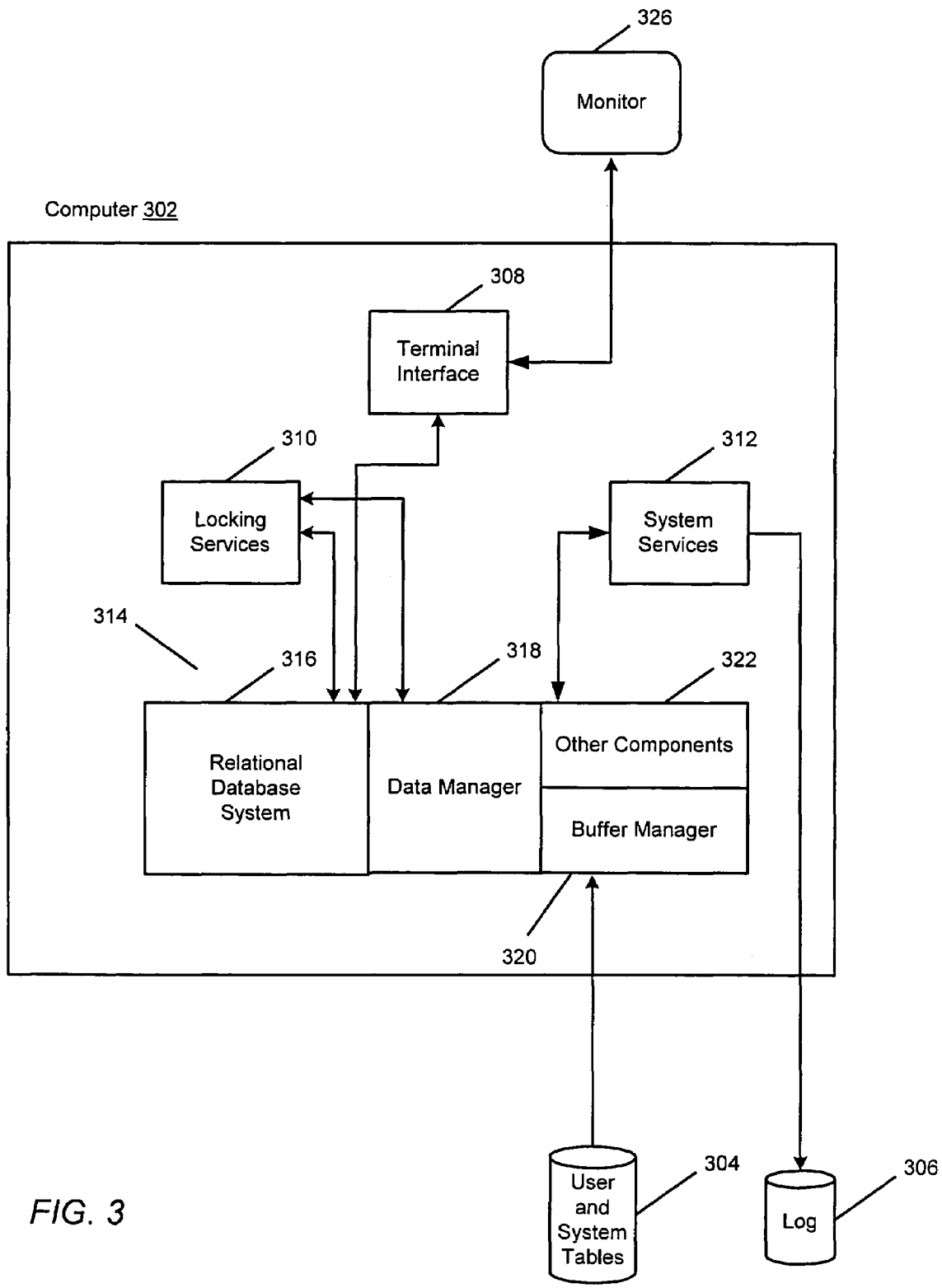
FIG. 3 is a hardware environment used to implement a server computer in one embodiment of the invention.

FIG. 3 is a hardware environment used to implement a server computer in one embodiment of the invention. In the environment, a computer system 302 is comprised of one or more processors connected to one or more data storage devices 304 and 306 that store one or more relational databases, such as a fixed or hard disk drive, a floppy disk drive, a CDROM drive, a tape drive, or other device.

Operators of the computer system 302 use a standard operator interface 308 to transmit electrical signals to and from the computer system 302 that represent commands for performing various search and retrieval functions, termed queries, against the databases.

In one embodiment of the present invention, the RDBMS software comprises the DB2® product for the OS/390® operating systems. Those skilled in the art will recognize, however, that the present invention has application to any RDBMS software, whether or not the RDBMS software uses SQL.

As illustrated in FIG. 3, the DB2® system for the OS/390® operating system includes three major components: the Internal Resource Lock Manager (IRLM) 310, the Systems Services module 312, and the Database Services module 314. The IRLM 310 handles locking services for the DB2® system, which treats data as a shared resource, thereby allowing any number of users to access the same data simultaneously. Thus concurrency control is required to isolate users and to maintain data integrity. The Systems Services module 312 controls the overall DB2® execution environment, including managing log data sets 306, gathering statistics, handling startup and shutdown, and providing management support.

At the center of the DB2® system is the Database Services module 314. The Database Services module 314 contains several submodules, including the Relational Database System (RDS) 316, the Data Manager 318, the Buffer Manager 320, and other components 322 such as a SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 314. The Database Services module 314 retrieves or receives the SQL statements, wherein the SQL statements are generally stored in a text file on the data storage devices 304 and 306 or are interactively entered into the computer system 302 by an operator sitting at a monitor 326 via operator interface 308. The Database Services module 314 then derives or synthesizes instructions from the SQL statements for execution by the computer system 302.

Generally, the RDBMS software, the SQL statements, and the instructions derived therefrom, are all tangibly embodied in a computer-readable medium, e.g. one or more of the data storage devices 304 and 306. Moreover, the RDBMS software, the SQL statements, and the instructions derived therefrom, are all comprised of instructions which, when read and executed by the computer system 302, causes the computer system 302 to perform the steps necessary to implement and/or use the present invention. Under control of an operating system, the RDBMS software, the SQL statements, and the instructions derived therefrom, may be loaded from the data storage devices 304 and 306 into a memory of the computer system 302 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 3 is not intended to limit the present invention. Indeed, those skilled in the art will recognize that other alternative hardware environments may be used without departing from the scope of the present invention.

Cross-Platform Subselect Metadata Extraction

A. Overview

The present invention provides a Metadata Extraction System 220 that extracts metadata across platforms. In particular, the metadata that is extracted includes data types of columns in a result set. Without knowledge of which platform the Metadata Extraction System 220 is running on, the Metadata Extraction System 220 can determine the metadata of a result set of a SELECT statement without returning or producing any customer data from the statement.

B. Stored Procedure Builder

The Metadata Extraction System 220 is part of a Stored Procedure Builder, which assists developers with the creation of stored procedures. A stored procedure has zero or more parameters. The stored procedure receives parameter values and is executed via SQL statements. Typically, a stored procedure is used to execute a group of SQL statements without user input (other than the initial parameter values).

In one embodiment of the invention, the stored procedure builder is the DB2® Stored Procedure Builder, which is a graphical application that supports the rapid development of stored procedures. The Stored Procedure Builder may be used to create stored procedures, build stored procedures on local and remote servers, modify and rebuild existing stored procedures, and run stored procedures for testing and debugging the execution of installed stored procedures. The Stored Procedure Builder provides a single development environment that supports many different platforms and works in conjunction with many different applications.

Figure 4:
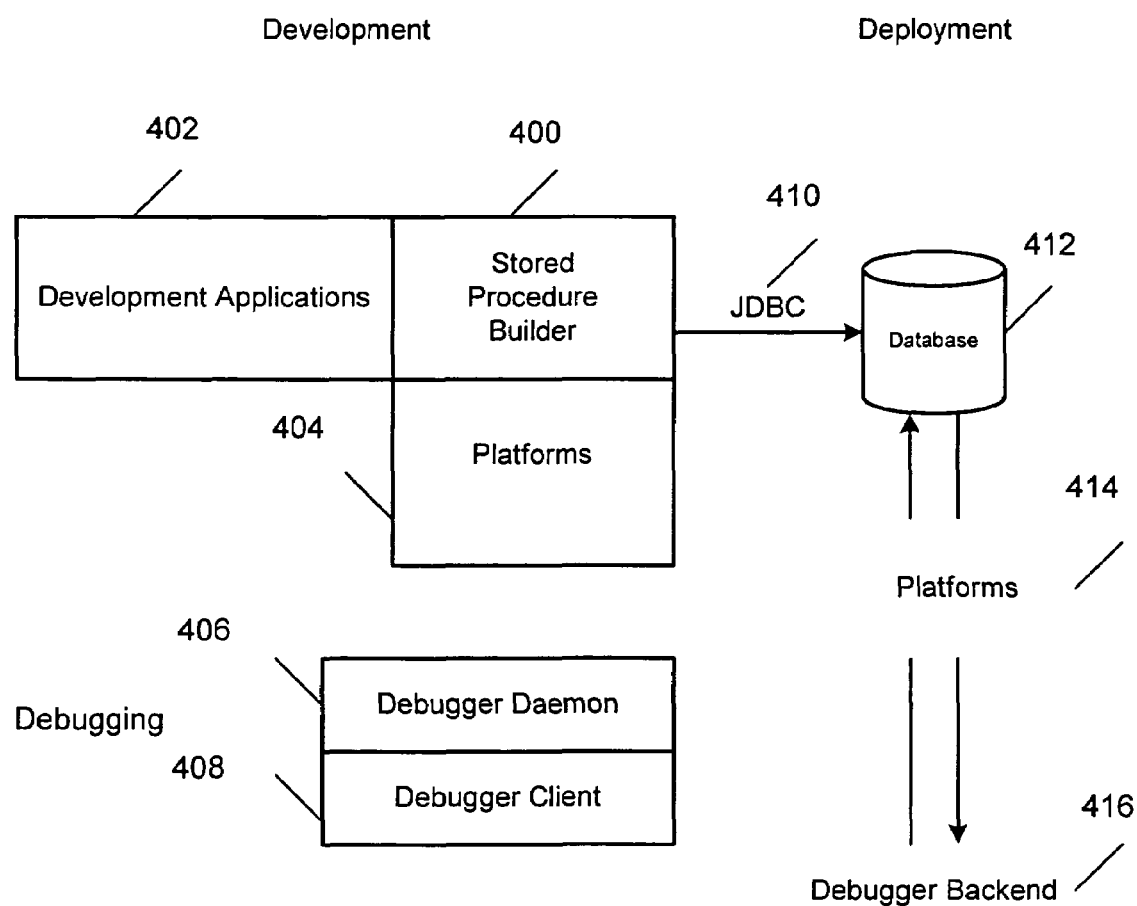
FIG. 4 illustrates the Stored Procedure Builder topology.

FIG. 4 illustrates the Stored Procedure Builder 400 topology. The topology includes development, debugging, and deployment components. As to development components, one of many Development Applications 402 is used to launch the Stored Procedure Builder 400, on one of many different Platforms 404. In particular, the Stored Procedure Builder can be launched as a separate application from the DB2® Universal Database® program group or from any of the following development applications: IBM® VisualAge® for Java™ Version 3.0 or later, Microsoft® Visual C++® Version 5 or later, Microsoft® Visual Basic® Version 5 or later, or IBM® DB2® Control Center. Some platforms include: AIX®, OS/2®, OS/390®, OS/400®, Sun Solaris®, UNIX®, Windows NT®, Windows 95®, Windows 98®, and Windows 2000®.

As to debugger components, a Debugger Daemon 406 and Debugger Client 408 are provided for debugging a stored procedure built with the Stored Procedure Builder 400. As to Deployment components, the Stored Procedure Builder 400 uses a Java™ Database Connectivity (JDBC) application programming interface (API) 410 to communicate with a Database 412. The Stored Procedure Builder is implemented with Java™ code and all database connections are managed by using a Java™ Database Connectivity (JDBC) application programming interface (API). Furthermore, the Database 412 may reside on one of many Platforms 414 and connected to a Debugger Backend 416. Some platforms include: AIX®, OS/2®, OS/390®, OS/400®, Sun Solaris®, UNIX®, Windows NT®, Windows 95®, Windows 98®, and Windows 2000®.

IBM, DB2, Universal Database (UDB), OS/2, OS/390, OS/400, AIX, and VisualAge are trademarks or registered trademarks of International Business Machines, Corporation in the United States and/or other countries.

UNIX is a trademark registered of UNIX Systems Laboratories in the United States and/or other countries.

Microsoft, Windows NT, Windows 95, Windows 98, Windows 2000, Visual C++, and Visual Basic are trademarks or registered trademarks of Microsoft Corporation in the United States and/or other countries.

Sun Solaris, JAVA, and JAVA-based marks are trademarks or registered trademarks of Sun Microsystems in the United States and/or other countries.

C. Metadata Extraction

A SQLJ iterator is a command that describes the output of a SELECT statement. This is used to statically bind a statement in DB2®. A technique for supporting the SQLJ iterator across platforms was needed. Thus, in order to support the SQLJ iterator across different platforms, the Metadata Extraction System 220 was developed. One advantage of the Metadata Extraction System 220 is that it supports SQLJ iterators (an important part of SQLJ) across different platforms, instead of just supporting it on one or a few platforms. Some platforms include: AIX®, OS/2®, OS/390®, OS/400®, Sun Solaris®, UNIX®, Windows NT®, Windows 95®, Windows 98®, and Windows 2000®.

The Metadata Extraction System 220 alters the SELECT statement by adding/inserting a false WHERE condition (e.g., WHERE 1=−1). The inclusion of the false WHERE condition results in no rows being returned, while metadata about the result set is available. In particular, even though no rows are returned, the MetaData via a Java.sql.ResultSet-MetaData field is still available and used to construct the iterator necessary for the generating SQLJ code where a SELECT statement is returning rows of data.

Since SQL is a complex language where there are a minimal set of reserved words, one or more false SQL statements are constructed and loaded into a list of statements to run. In one embodiment, the number of false SQL statements will be equivalent to the number of WHERE clauses. For example, if a SQL statement has a WHERE clause, then one false WHERE clause is generated and used to replace the original WHERE clause and anything following it (e.g., a GROUP BY clause). If a SQL statement has two WHERE clauses, then one false WHERE clause is generated and used to replace both of the WHERE clauses and everything following them and a second false WHERE clause is generated and used to replace the second WHERE clause and everything following it (i.e., this leaves the first WHERE clause in the SQL statement. The first SQL statement with a false WHERE clause to run without experiencing a SQL exception is the one used to extract the MetaData.

The Metadata Extraction System 220 improves performance by removing the ORDER BY clauses, should they exist in the statement. Also, the Metadata Extraction System 220 handles subselect statements (e.g., a WHERE clause within a WHERE clause). In one embodiment, the pseudocode is not applied to SELECT <column name> INTO statements because results are directly loaded into variables.

Additionally, if the SQL statement requires that the application program pass in parameter values at run time (e.g., the parameters could be used in an expression), default values are used by the Metadata Extraction System 220 when executing a SQL statement with one or more false clauses so that the SQL statement can run properly.

Figure 5:
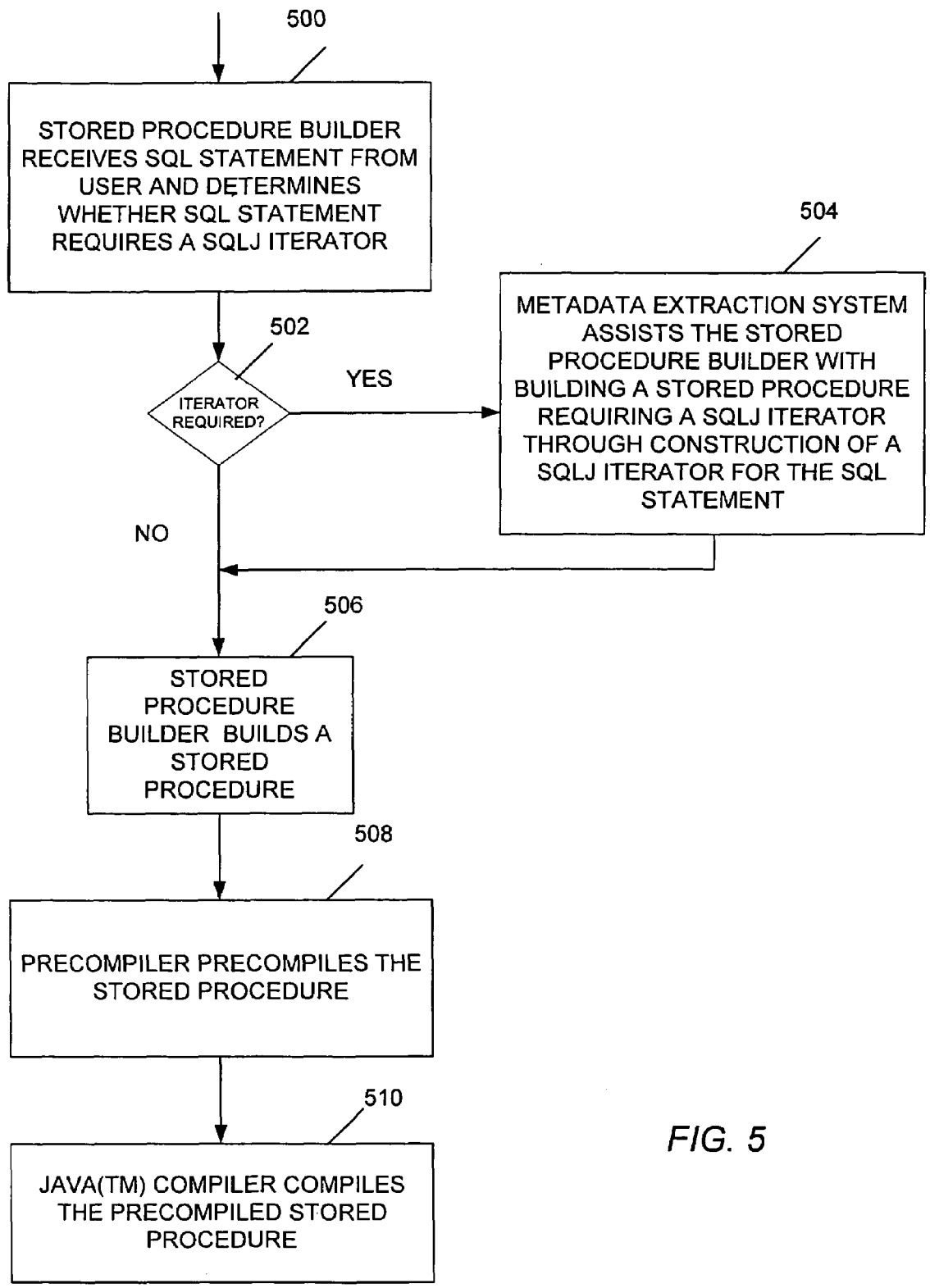
FIG. 5 is a flow diagram of a general overview for building and compiling stored procedures using the present invention.

FIG. 5 is a flow diagram of a general overview for building and compiling stored procedures using the present invention. Note that FIG. 5 describes processing of one SQL statement for illustration only, and one skilled in the art would recognize that multiple statements may be processed and incorporated into a single stored procedure. Additionally, although the stored procedure builder, precompiler, and compiler are discussed as separate entities, they may be combined in various manners, resulting in fewer separate entities (e.g., the stored procedure builder and precompiler may be combined).

In block 500, a stored procedure builder receives a SQL statement from a user and determines whether the SQL statement requires a SQLJ iterator. A SQL statement requires an iterator if it is a SELECT statement, other than a SELECT INTO statement (which selects data into one or more variables). In block 502, if an iterator is required, processing continues with block 504, otherwise, processing continues with block 506.

In block 504, the Metadata Extraction System 220 assists the stored procedure builder with building a stored procedure requiring a SQLJ iterator through construction of a SQLJ iterator for the SQL statement and continues to block 508 for precompiling. In block 506, the stored procedure builder builds a stored procedure and continues to block 508 for precompiling. In block 508, a precompiler precompiles the stored procedure. In block 510, a Java™ compiler compiles the precompiled stored procedure.

The following provides pseudocode for the Metadata Extraction System 220:

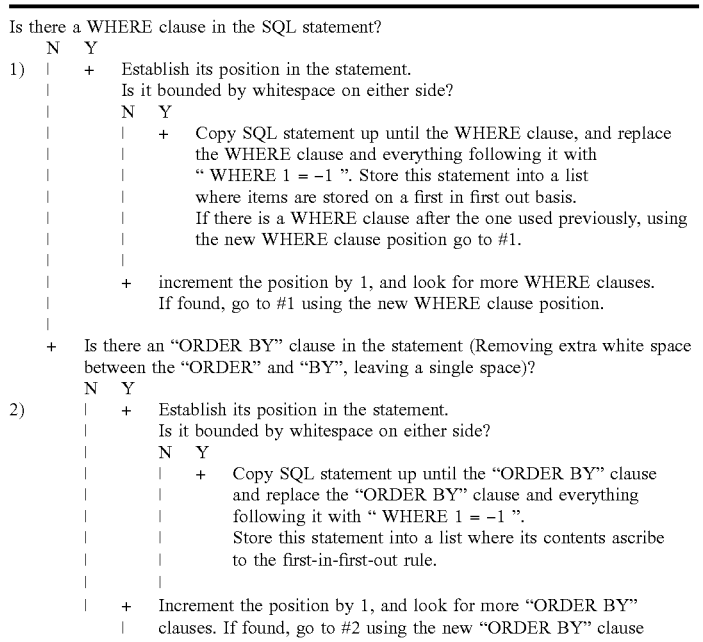

-continued

| | position. |
|---|---|
| + | Create a SQL statement (and add it to the list described above) by copying the current SQL statement and appending " WHERE 1 = −1 " to the end. |

Figure 6:
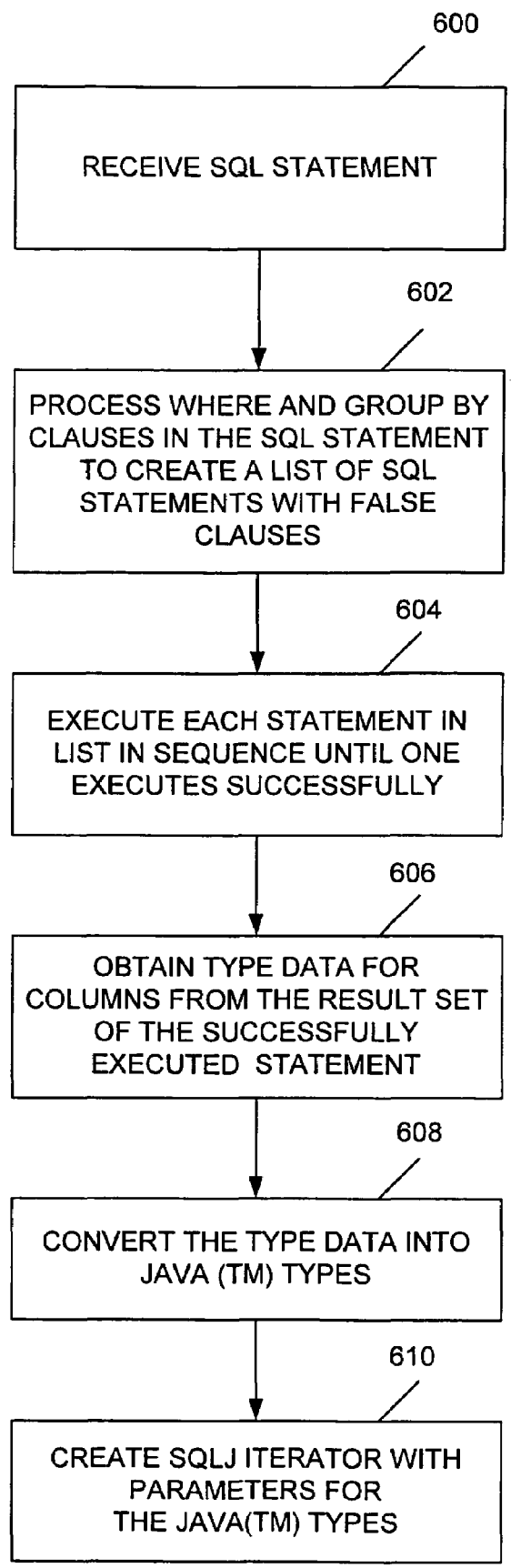
FIG. 6 is a flow diagram of the processing performed by the Metadata Extraction System.

FIG. 6 is a flow diagram of the processing performed by the Metadata Extraction System 220. In block 600, the Metadata Extraction System 220 receives a SQL statement. In block 602, the Metadata Extraction System 220 processes WHERE and GROUP BY clauses in the SQL statement to create a list of SQL statements with false clauses. In block 604, the Metadata Extraction System 220 executes each statement in list in sequence until one executes successfully. In block 606, the Metadata Extraction System 220 obtains type data for columns from the result set of the successfully executed statement. In block 608, the Metadata Extraction System 220 converts the type data into JAVA™ types. In block 610, the Metadata Extraction System 220 creates a SQLJ iterator with parameters having the JAVA™ types.

D. Examples

D.1 Sample SOLJ Code with Different Data Types

In the following example, a default table selection is made via, for example, a user interface on the client computer, with the client and server being on the same machine.

Initially, a user enters an initial SQL statement of: SELECT * FROM SYSCAT.PROCEDURES. Then, the Stored Procedure Builder 218 and Metadata Extraction System 220 work in conjunction to produce SQLJ Stored Procedure QUEST.Procedure4, with a SQLJ iterator that tells the RDBMS how to bind a result set. In particular, the Metadata Extraction System 220 generates the SQLJ iterator. Each parameter of the SQLJ iterator is a Java™ type that corresponds to a type in the initial SQL statement. The Stored Procedure Builder generates the import statements and the public class Procedure4 code, which includes the initial SQL statement and a result set parameter "rs" that returns a result set to a calling application.

D.2 Sample SQLJ Code with Different Data Types

In the following example, a table with different datatypes is accessed. Again the stored procedure is built after receiving user input.

Initially, a user enters a SELECT statement. Then, the Stored Procedure Builder 218 and Metadata Extraction System 220 work in conjunction to produce SQLJ Stored Procedure QUEST.Procedure5, with a SQLJ iterator that tells the RDBMS how to bind a result set. In particular, the Metadata Extraction System 220 generates the SQLJ iterator. Each parameter of the SQLJ iterator is a Java™ type that corresponds to a type in the initial SQL statement. The Stored Procedure Builder generates the import statements and the public class Procedure5 code, which includes the initial SELECT statement and a result set parameter "rs" that returns a result set to a calling application.

```
/**
 * SQLJ Stored Procedure QUEST.Procedure4
 */
import java.sql.*;          // JDBC classes
import sqlj.runtime.*;
import sqlj.runtime.ref.*;
#sql iterator Procedure4_Cursor1 ( String, String, String, int, String,
                                   short, byte[ ], String, java.sql.Timestamp,
                                   String, String, String, String, String, String,
                                   String, String, String, String, String, short,
                                   String, int, String, String );
public class Procedure4
{
    public static void procedure4 ( ResultSet[ ] rs ) throws SQLException, Exception
    {
        Procedure4_Cursor1 cursor1 = null;
        #sql cursor1 =
        {
            SELECT * FROM SYSCAT.PROCEDURES
        };
        rs [0] = cursor1.getResultSet ( );
    }
}
```

```
/**
 * SQLJ Stored Procedure QUEST.Procedure5
 */
import java.sql.*;          // JDBC classes
import sqlj.runtime.*;
import sqlj.runtime.ref.*;
#sql iterator Procedure5_Cursor1 ( String, String, String, java.math.BigDecimal,
                                   short, int, long, float, double, java.sql.Date,
                                   Java.sql.Time, java.sql.Timestamp );
public class Procedure5
{
    public static void procedure5 ( ResultSet[ ] rs ) throws SQL Exception, Exception
    {
        Procedure5_Cursor1 cursor1 = null;
        #sql cursor1 =
        {
            SELECT
                ALLTYPES.CHAR AS CHAR,
                ALLTYPES.VARCHAR AS VARCHAR,
                ALLTYPES.LONGVARCHAR AS LONGVARCHAR,
                ALLTYPES.DECIMAL AS DECIMAL,
                ALLTYPES.SMALLINT AS SMALLINT,
                ALLTYPES.INTEGER AS INTEGER,
                ALLTYPES.BIGINT AS BIGINT,
                ALLTYPES.REAL AS REAL,
                ALLTYPES.DOUBLE AS DOUBLE,
                ALLTYPES.DATE AS DATE,
                ALLTYPES.TIME AS TIME,
                ALLTYPES.TIMESTAMP AS TIMESTAMP
            FROM
                ALLTYPES
        }
        rs[0] = cursor1.getResultSet ( );
    }
}
```

Once metadata is obtained by executing a SQL statement with a false clause, JDBC to Java™ conversion is performed. In one embodiment, a hash code conversion table is used. A portion of the hash code conversion table used for the conversion that can be seen in Example 2, in which the ALLTYPES table is accessed, follows:

```
jdbcJava.put (new Integer(Types.CHAR), "String");
jdbcJava.put (new Integer(Types.VARCHAR), "String");
jdbcJava.put (new Integer(Types.LONGVARCHAR), "String");
jdbcJava.put (new Integer(Types.NUMERIC), "java.math.BigDecimal");
jdbcJava.put (new Integer(Types.DECIMAL), "java.math.BigDecimal");
jdbcJava.put (new Integer(Types.BIT), "boolean");
jdbcjava.put (new Integer(Types.TINYINT), "byte");
jdbcjava.put (new Integer(Types.SMALLINT), "short");
jdbcJava.put (new Integer(Types.INTEGER), "int");
jdbcJava.put (new Integer(Types.BIGINT), "long");
jdbcJava.put (new Integer(Types.REAL), "float");
jdbcJava.put (new Integer(Types.FLOAT), "double");
jdbcjava.put (new Integer(Types.DOUBLE), "double");
jdbcjava.put (new Integer(Types.BINARY), "byte[ ]");
jdbcJava.put (new Integer(Types.VARBINARY), "byte[ ]");
jdbcJava.put (new Integer(Types.LONGVARBINARY), "byte[ ]");
jdbcjava.put (new Integer(Types.DATE), "java.sql.Date");
jdbcjava.put (new Integer(Types.TIME), "java.sql.Time");
jdbcJava.put (new Integer(Types.TIMESTAMP), "java.sql.Timestamp");
```

Each of the Types.xxxx are defined constants in the class Types that is in the package java.sql The class Types defines constants that are used to identify generic SQL types, called JDBC types.

D.3 Sample SQLJ Code with Different Data Types

In the following example, a sample SQL statement is used that includes WHERE clauses.

The following tables AB and XY illustrate sample tables before a stored procedure is executed against them. All columns are declared as INTEGER types in the example.

The following statement is used to display the contents of table TBLAB: db2=>select * from tblab.

TABLE AB

| COLA | COLB |
|---|---|
| 1 | 12 |
| 2 | 12 |
| 3 | 13 |
| 4 | 14 |

4 record(s) selected.

The following statement is used to display the contents of table TBLXY: db2=>select * from tblxy

TABLE XY

| COLX | COLY |
|---|---|
| 2 | 22 |
| 3 | 23 |

2 record(s) selected.

The following stored procedure, SQLJ Stored Procedure QUEST.Procedure6, is built with the Stored Procedure Builder 218 in conjunction with the Metadata Extraction System 220 and includes a SQLJ iterator that tells the RDBMS how to bind a result set.

Initially, a user enters the following statement: SELECT COLA FROM TBLAB WHERE COLA>ALL (SELECT COLX FROM TBLXY WHERE COLX<0). Note that the SELECT COLX statement within the SELECT COLA statement is referred to as a subselect statement. Also, the SELECT COLA statement has two WHERE clauses. Thus, the Metadata Extraction System 220 generates two different SQL statements with false clauses.

```
/**
* SQLJ Stored Procedure QUEST.Procedure6
*/
import java.sql.*;          // JDBC classes
import sqlj.runtime.*;
import sqlj.runtime.ref.*;
#sql iterator Procedure6__Cursor1 ( int );
public class Procedure6
{
    public static void procedure6 ( ResultSet[ ] rs ) throws SQLException, Exception
    {
        Procedure6__Cursor1 cursor1 = null;
        #sql cursor1 =
        {
            SELECT COLA FROM TBLAB
                WHERE COLA > ALL (SELECT COLX FROM TBLXY
                                  WHERE COLX<0)
        };
        rs[0] = cursor1.getResultSet( );
    }
}
```

The following table represents the result of executing the stored procedure public class Procedure6:

| COLA |
| --- |
| 1 |
| 2 |
| 3 |
| 4 |

4 record(s) selected.

CONCLUSION

This concludes the description of one embodiment of the invention. The following describes some alternative embodiments for accomplishing the present invention. For example, any type of computer, such as a mainframe, minicomputer, or personal computer, or computer configuration, such as the Internet, a local area network, or wide area network, could be used with the present invention.

The foregoing description of one embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for executing a query against a database on a data storage device connected to a computer, the method comprising:
    modifying the query to replace one or more selected clauses with one or more false clauses;
    executing the modified query with the one or more false clauses; and
    retrieving metadata from the result set obtained by executing the modified query.

2. The method of claim 1, wherein the query comprises a SELECT statement.

3. The method of claim 2, wherein the SELECT statement is not a SELECT INTO statement.

4. The method of claim 1, wherein the selected clauses comprise WHERE clauses.

5. The method of claim 1, wherein the selected clauses comprise GROUP BY clauses.

6. The method of claim 1, wherein modifying the query comprises:
    generating a list of modified queries, wherein each modified query has one or more selected clauses replaced with one or more false clauses; and
    executing each modified query until one executes successfully.

7. The method of claim 6, wherein a query executes successfully if it executes without an exception.

8. The method of claim 1, wherein the metadata comprises column type data for the result set.

9. The method of claim 8, further comprising converting the column type data to JAVA types.

10. The method of claim 9, further comprising generating a SQLJ iterator with parameters having the JAVA types.

11. The method of claim 1, further comprising determining whether the query requires a SQLJ iterator.

12. An apparatus for executing a query, comprising:
    a computer connected a data storage device that stores a database containing data;
    one or more computer programs, performed by the computer, for modifying the query to replace one or more selected clauses with one or more false clauses, executing the modified query with the one or more false clauses, and retrieving metadata from the result set obtained by executing the modified query.

13. The apparatus of claim 12, wherein the query comprises a SELECT statement.

14. The apparatus of claim 13, wherein the SELECT statement is not a SELECT INTO statement.

15. The apparatus of claim 12, wherein the selected clauses comprise WHERE clauses.

16. The apparatus of claim 12, wherein the selected clauses comprise GROUP BY clauses.

17. The apparatus of claim 12, wherein modifying the query comprises:
   generating a list of modified queries, wherein each modified query has one or more selected clauses replaced with one or more false clauses; and
   executing each modified query until one executes successfully.

18. The apparatus of claim 17, wherein a query executes successfully if it executes without an exception.

19. The apparatus of claim 12, wherein the metadata comprises column type data for the result set.

20. The apparatus of claim 19, further comprising converting the column type data to JAVA types.

21. The apparatus of claim 20, further comprising generating a SQLJ iterator with parameters having the JAVA types.

22. The apparatus of claim 12, further comprising determining whether the query requires a SQLJ iterator.

23. An article of manufacture comprising a computer program carrier readable by computers and embodying one or more instructions executable by the computer for executing a query against a database on a data storage device connected to the computer, comprising:
   modifying the query to replace one or more selected clauses with one or more false clauses;
   executing the modified query with the one or more false clauses; and
   retrieving metadata from the result set obtained by executing the modified query.

24. The article of manufacture of claim 23, wherein the query comprises a SELECT statement.

25. The article of manufacture of claim 24, wherein the SELECT statement is not a SELECT INTO statement.

26. The article of manufacture of claim 23, wherein the selected clauses comprise WHERE clauses.

27. The article of manufacture of claim 23, wherein the selected clauses comprise GROUP BY clauses.

28. The article of manufacture of claim 23, wherein modifying the query comprises:
   generating a list of modified queries, wherein each modified query has one or more selected clauses replaced with one or more false clauses; and
   executing each modified query until one executes successfully.

29. The article of manufacture of claim 28, wherein a query executes successfully if it executes without an exception.

30. The article of manufacture of claim 23, wherein the metadata comprises column type data for the result set.

31. The article of manufacture of claim 30, further comprising converting the column type data to JAVA types.

32. The article of manufacture of claim 31, further comprising generating a SQLJ iterator with parameters having the JAVA types.

33. The article of manufacture of claim 23, further comprising determining whether the query requires a SQLJ iterator.

* * * * *